June 24, 1969  R. W. LOGAN  3,451,504
AIRCRAFT SERVICE STAND

Filed April 17, 1968  Sheet 5 of 6

INVENTOR.
RICHARD W. LOGAN
BY Burns, Doane, Benedict,
Swecker & Mathis
ATTORNEYS

United States Patent Office 3,451,504
Patented June 24, 1969

1

3,451,504
AIRCRAFT SERVICE STAND
Richard W. Logan, Miami, Fla., assignor to Federal Sign and Signal Corporation, Blue Island, Ill., a corporation of New York
Filed Apr. 17, 1968, Ser. No. 721,987
Int. Cl. E06c *1/39, 1/397, 7/08*
U.S. Cl. 182—1                    5 Claims

ABSTRACT OF THE DISCLOSURE

An aircraft service stand characterized by a planar base, an upright tower, and generally vertically extending, wedge-shaped, and horizontally diverging wings which define a shielded area. Articulated stairway and working platform means are mounted on the tower for vertical, pivotal movement, with the platform moving vertically between the vertical planes aligned with the diverging wings.

---

This invention relates to a stand designed specifically for the servicing of aircraft.

General background of invention

Service stands adapted specifically to facilitate the servicing, cleaning, and loading of aircraft have long been in existence. For example, such a stand is illustrated in a United States Matthews Patent D. 199,148.

Because of the various elevations at which aircraft servicing personnel must operate, it is necessary to provide a working platform which may be selectively adjusted in elevation. Where such elevation requirements exist, it is important to shield operating personnel and equipment from moving components. It is also desirable to ensure that the service stand is effectively stabilized without requiring inordinate space for stabilizing structure.

Likewise, it is important to provide servicing stands which are portable in character, which have a center of gravity which is as low as possible, and which may be moved into close proximity to aircraft units to be serviced.

General objects and summary of invention

It is a particular object of the invention to provide an improved aircraft service stand which provides, in the context of an articulated stairway and working platform, a low center of gravity.

Yet another object of the invention is to provide an overall simplified tower structure which may be moved into close proximity to an aircraft.

It is likewise an object of the invention to provide shielding and stabilizing wings which occupy minimum space.

It is likewise an object of the invention to provide such an improved structure in which a rectangularly cross sectioned tower is provided so as to afford particularly effective equipment mounting surfaces and minimize horizontal tower dimensions.

Because of the various levels where operators might be located with respect to a service stand, it is another object of the invention to provide a compound control system for effecting elevation of a working platform, which control system may be operated from a series of control stations located at different zones in the stand.

In accomplishing at least some of the foregoing objects, there is provided, through this invention, a service stand including base means defined by a plurality of framing members. These framing members are oriented in a substantially horizontal and coplanar relationship. A tower means is defined by a plurality of horizontally spaced, vertically extending and mutually parallel framing means. These framing means are interconnected with the base means and project upwardly therefrom. The tower means has a generally rectangular, horizontal cross section. First and second generally wedge-shaped shield means are included in the stand. Each of these first and second shield means comprises a plurality of framing members disposed in substantially coplanar alignment with a vertical plane. The vertical alignment planes of the first and second shield means diverge horizontally outwardly from the tower means and cooperate with the tower means to define an unobstructed and laterally shielded zone adjacent the tower means and the base means.

A platform means is also included in the stand. Pivot mounting means spaced vertically above the shield means pivotally connects the platform means with the tower means for vertical, pivotal movement between the diverging vertical planes of the first and second shield means. An articulated stair means is carried by the pivot mounting means and includes a plurality of treads. A parallelogram linkage means is connected with the treads, the platform means and the tower means, and is operable to maintain the treads and the platform means in substantially horizontal alignment throughout the vertical pivotal movement of the platform means. Wheel means connected with the base means support the stand for rolling movement along a ground surface.

Drawings

In describing the invention, reference will be made to preferred embodiments illustrated in the appended drawings.

In the drawings.

*Basic stand structure*

FIGURES 1 through 6 illustrate the basic structure of a stand 1 which is specifically intended to service modern-day aircraft.

Stand 1 includes a base 2 defined in part by interconnected framing members 3, 4, 5 and 6. These framing members are oriented in substantially coplanar relationship and are generally aligned in a horizontal plane when the stand 1 is supported on a horizontal surface.

A tower 7 is defined by four upright, vertically extending, mutually parallel and horizontally spaced members 8, 9, 10 and 11. These tower side-defining vertical members 8, 9, 10 and 11 are interconnected by a network of struts as shown in FIGURES 1 through 6.

Stand 1 also includes a pair of diverging and generally wedgeshaped shields 12 and 13. Shield 12 is defined by top framing member 14, vertical members 15, and inclined struts 16, all of which are aligned with a vertically extending plane. As shown, member 14 is connected with tower member 9. Base member 3 is also connected with tower member 9 so as to interconnect the shield 12 with the base 2, as well as the tower 7.

Shield 13 is defined by interconnected structural members including top member 17, vertical members 18, and inclined members 19. Memeber 17 is joined to tower member 10 by a welded bracket 20, as are horizontal base member 6 and member 14, so as to rigidly interconnect the base 2 to the shields 12 and 13 and the tower 7. All of the structural members 17 through 19, as well as base member 6, are substantially aligned with a vertical plane.

The vertical alignment planes of shields 12 and 13 diverge outwardly away from the tower 11 in symmetrical relation with respect to a vertical plane passing between the tower members 10 and 11.

As will thus be appreciated, the vertical or upright tower members 8, 9, 10 and 11, define a tower having a generally rectangular cross section. This tower is connected to the base 2 by way of shields 12 and 13.

Tower 1 also includes a pair of generally V-shaped stabilizing wings 21 and 22. Each of stabilizing wings 21 and 22 includes, as a base component, a portion of a framing member 23. Framing member 23 is connected to tower members 8 and 11 so as to extend perpendicular to the median plane passing vertically between the tower members 8 and 11. Stabilizing base members 23 may be viewed as a portion of the base 2 in that it is disposed in coplanar alignment with the other framing members of the base 2, previously identified.

As will be apparent, by reference to the drawings, wing 21 is defined by base member portion 23a and framing member 24. Framing portion 23a and member 24 are both joined to the tower 7 and diverge outwardly away from the tower 7 in general alignment with the common plane of the tower members 8 and 11.

Similarly, stabilizing wing 22 is defined by base member portion 23b and a framing member 25. Framing portion 23b and member 25 are both connected with the tower 7 and diverge outwardly away from the tower 7 in generally coplanar alignment with the wing 21 and the common plane of the tower side defined by upright members 8 and 11. As will thus be recognized, wings 21 and 22 are disposed in generally coplanar alignment with a vertical plane which extends perpendicular to the median plane passing symmetrically between the shields 12 and 13.

Stand 1 also includes a working platform 26. Platform 26 is defined by framing 27 which supports flooring or decking 28. A pivot connection 29 serves to pivotally interconnect the working platform 26 with the tower 7.

Pivot connection 29 is defined by a truss 30. This truss is pivotally connected to the platform 26 at pivot connection 31 and is pivotally connected to the tower 7 at pivot connection 32.

An operating mechanism 33 interconnects the truss 30 with the tower 7 so as to effect selective pivotal movement of the truss 30. Structural details of this operating mechanism will be subsequently described.

Truss 30 supports an articulated stair arrangement 34. This articulated stair arrangement, the platform 26 and the tower 7, are interconnected by a parallelogram linkage 35.

Figures 14, 15:
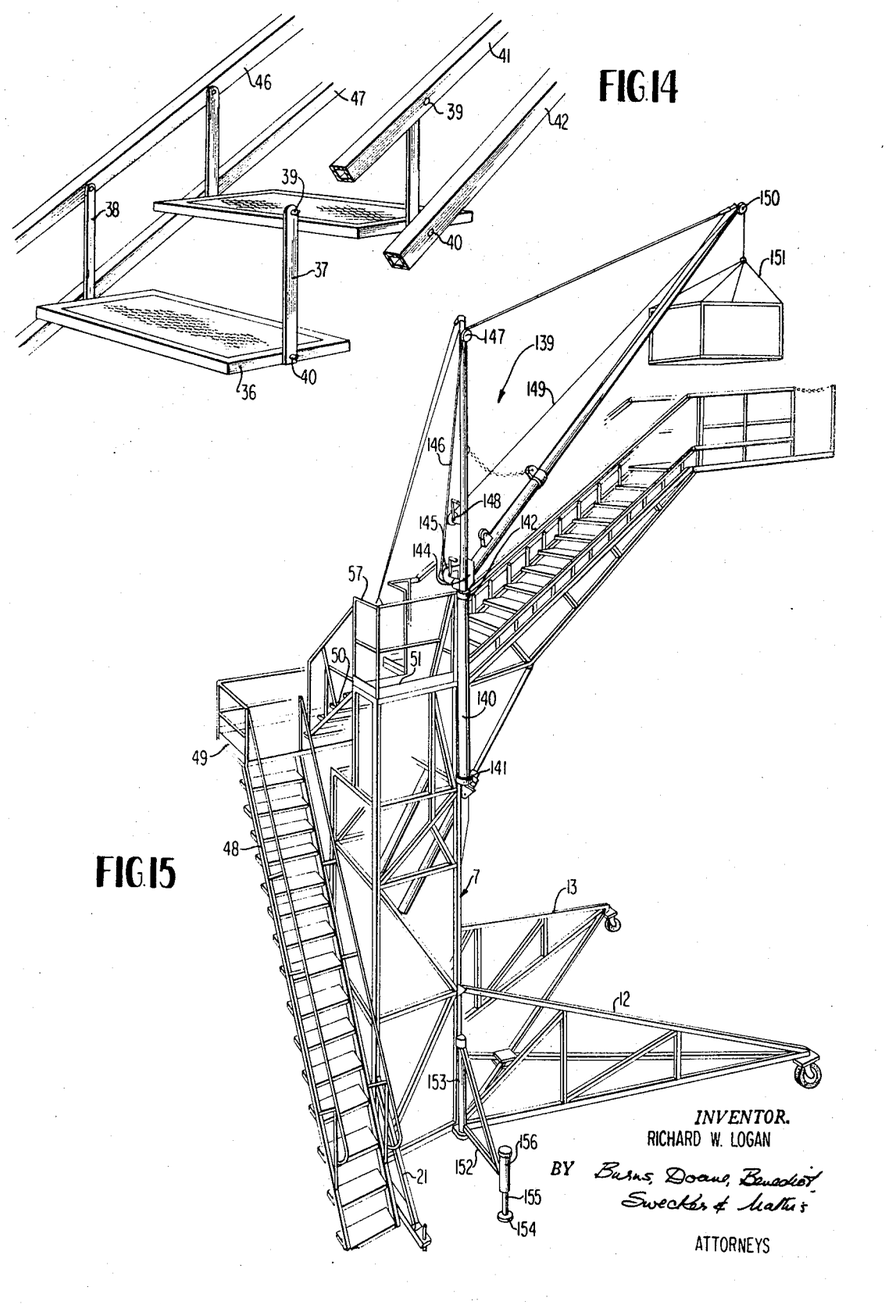
FIGURE 14 provides an enlarged, perspective and fragmentary view of parallelogram linkage and treads of an articulated stairway incorporated in the FIGURE 1 stand.
FIGURE 15 provides a reduced scale view of the FIGURE 1 stand modified by the addition of a boom arrangement capable of handling loads in the vicinity of the working platform.

Stairs 34 comprise a plurality of treads 36, some of which are shown in enlarged detail in FIGURE 14. Each tread is rigidly connected, as by welding, to a pair of struts 37 and 38. Strut 37 is journaled by upper and lower pivots 39 and 40 in one pair of parallel parallelogram members 41 and 42, respectively. Parallelogram members 41 and 42 are pivotally connected at pivot joints 43 and 32, respectively, to the tower 7. These parallelogram members 41 and 42 are pivotally connected at pivot joints 31 and 44, respectively, to framing 45 rigidly mounted on the platform 26.

Parallelogram members 41 and 42 are disposed in general alignment with a vertical alignment plane. This vertical alignment plane is also generally aligned with the side of tower 7 defined by framing members 8 and 9.

The link 38 is pivotally journaled at its upper and lower ends on another pair of parallelogram members 46 and 47, as schematically shown in FIGURE 14. Members 46 and 47 are disposed in mutually parallel relationship and are oriented in alignment with a vertical plane which is disposed in substantially coplanar alignment with the side of the tower 7 defined by framing members 10 and 11. As will thus be recognized, the common plane of the parallelogram members 46 and 47 is parallel to the vertical alignment plane of the parallelogram members 41 and 42.

With this parallelogram arrangement, pivotal movement of the truss 30 will take place, with the platform 26 as well as the treads 36 remaining in a position of subtantially horizontally extending alignment.

Figure 1:
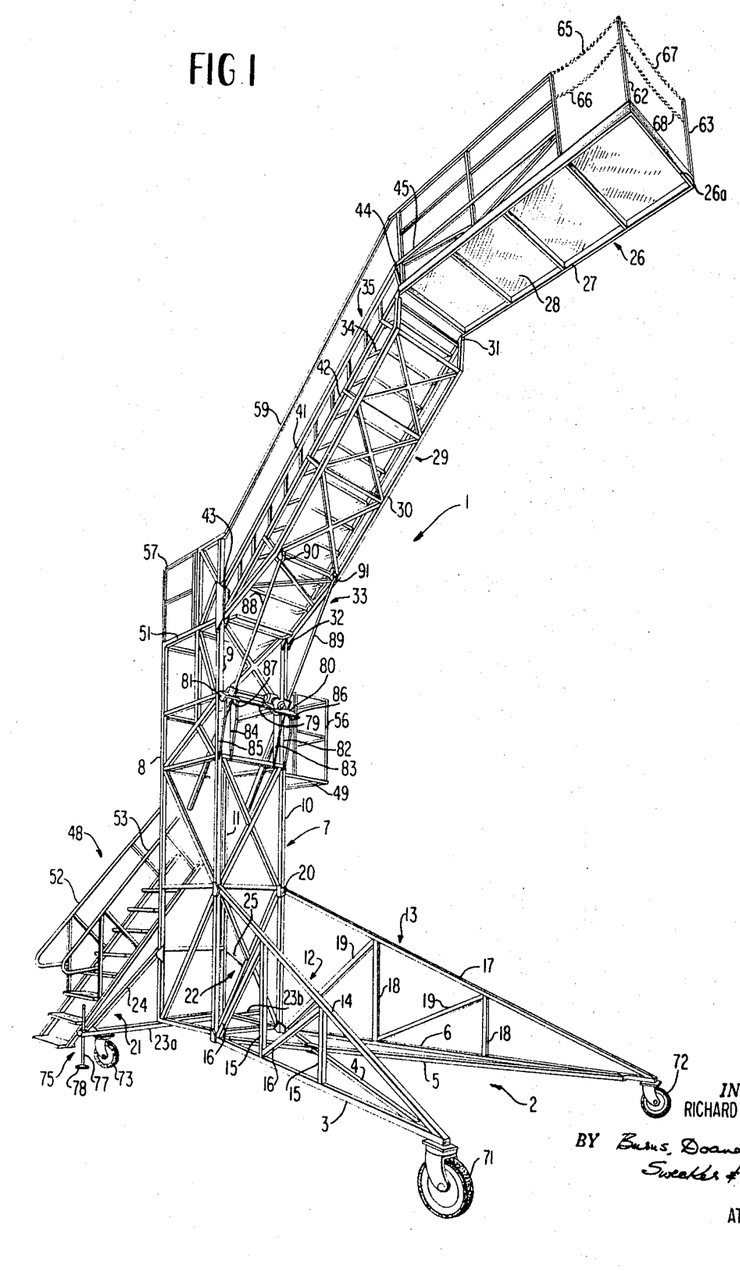
FIGURE 1 provides a perspective view of a front portion of a basic, preferred form of the service stand of the present invention, illustrating a working platform in an elevated position.

Stand 1 additionally includes a stair system by means of which an operator may move from a ground surface, through the tower 7, and onto the stairs 34 for ultimate passage to the work platform surface 28.

This stairway arrangement comprises a first stairway 48 which is mounted on the rear of the tower 7 as defined by the framing members 8 and 11. This stairway 48 is inclined generally upwardly and passes perpendicularly to the median plane passing between the shields 12 and 13.

Stairway 48 terminates in a generally horizontally extending landing 49. Landing 49 is disposed somewhat outboard of the side of the tower 7 defined by the members 10 and 11.

A second stairway 50 extends upwardly from the landing platform 49 to an upper, somewhat L-shaped, landing platform 51.

Platform 51 is bounded by the corner framing 8, 9 and 10. A corner notch 51a provides a transition zone which enables the upper portion 50a of the stairway to enter the platform 51 within the rectangular cross section of the tower 7. In this connection, it will be noted that the tower framing member 11 is terminated beneath the stairway 50, in view of the intrusion of the platform 51.

As will be appreciated, with reference to the drawings, upper platform or landing 51 is disposed adjacent the articulated stairway 34, i.e. defines a stationary tread of this stairway.

Railings 52 and 53 are provided for the stairway 48. Other railings 54 and 55 are provided for stairway 50. A generally U-shaped transition railing 56 interconnects the railings 52 and 54 and thus protects operators who are on the landing 49.

A railing network 57 provides a safety barrier encircling the landing 51, leaving only the entry portion 51b and the exit portion 51c unbarricaded.

Railings 58 and 59 protect operators on the stairs 34. These railings 58 and 59 are pivotally mounted on the railing 57 and are pivotally connected to railing portions of the platform 26 so as to function as parallelogram linkage members interconnecting the platform 26 and the tower 7. For work access purposes, railings 58 and 59 may be detachably mounted.

Figure 2:
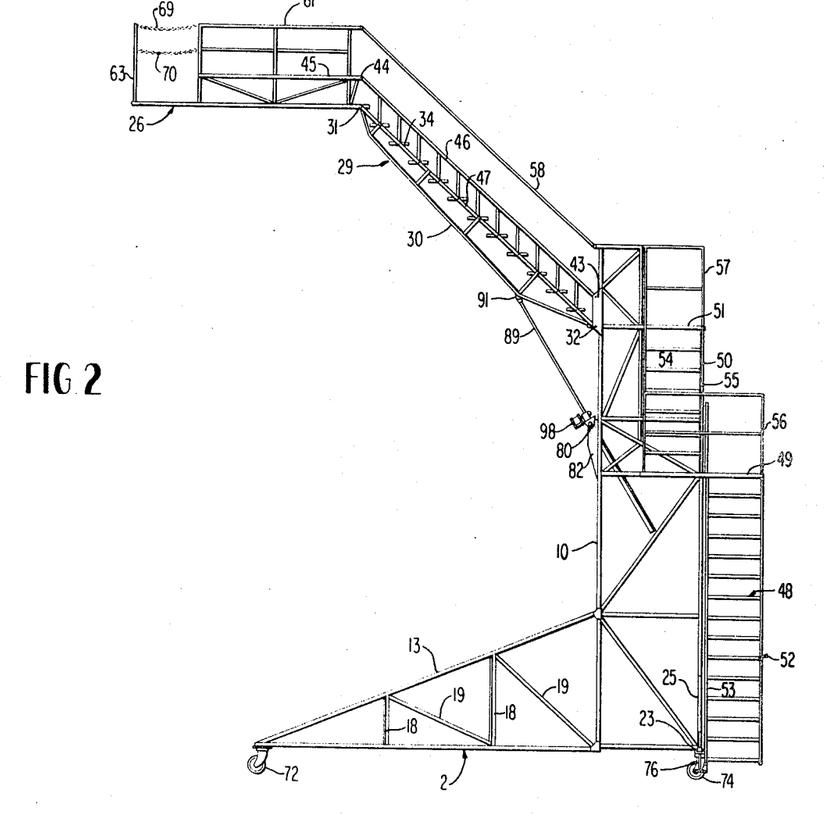
FIGURE 2 provides a reduced scale view of one side of the FIGURE 1 stand.
Figure 3:
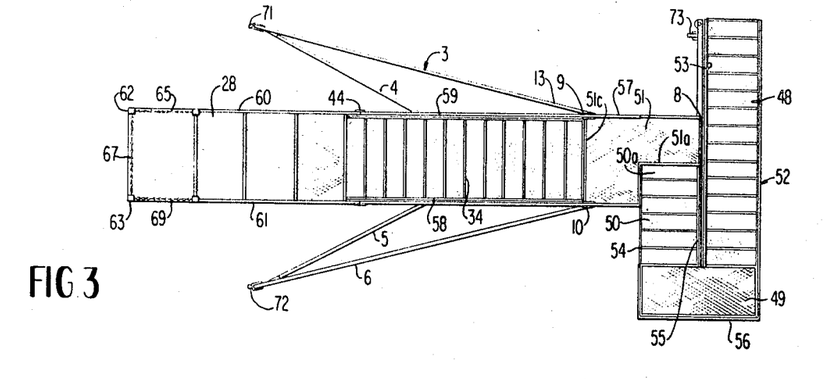
FIGURE 3 provides a reduced scale, top plan view of the FIGURE 1 stand.
Figures 4, 5:
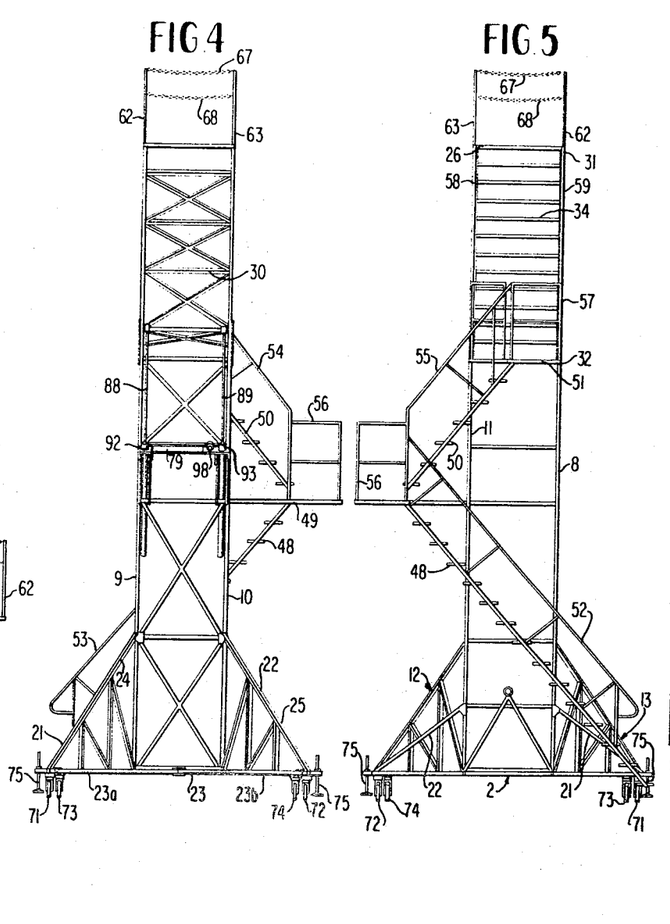
FIGURE 4 provides a reduced scale, front elevational view of the FIGURE 1 stand.
FIGURE 5 provides a reduced scale, rear elevational view of the FIGURE 1 stand.
Figure 6:
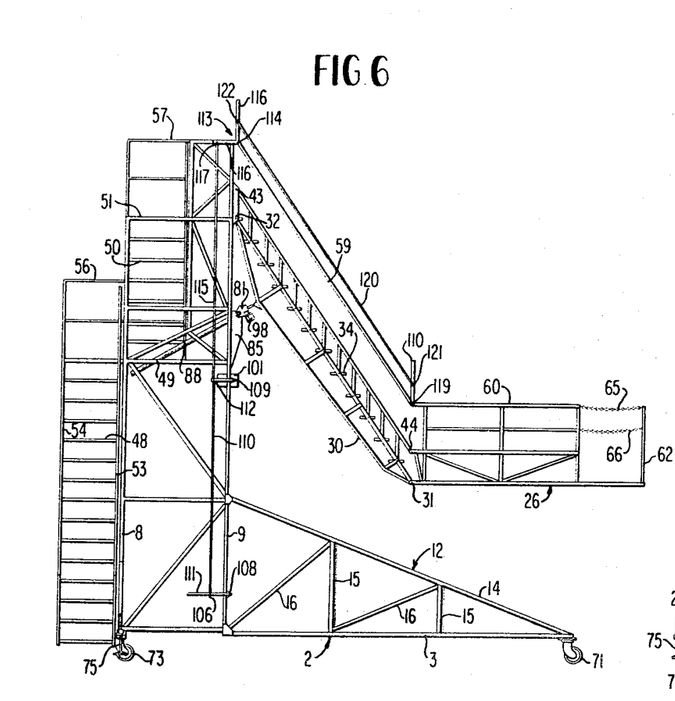
FIGURE 6 provides a reduced scale view of a side of the FIGURE 1 stand opposite to that shown in FIGURE 2, with the working platform disposed in a lowered position.

As shown in FIGURES 1 and 2, railings 60 and 61 extend along the sides of platform 26 in substantially coplanar alignment with the railings 59 and 58, respectively. Railings 60 and 61 terminate short of the outermost end 26a of the platform. A pair of upright corner posts 62 and 63 project upwardly from the platform end 26a. Detachable chains 65, 66, 67, 68, 69 and 70 are mounted on the posts 62 and 63 and the railing 60 and 61, so as to provide selectively detachable and removable barriers.

These chains may be detachably mounted by snap fasteners, hooks or other conventional detachable fastening means.

As will be appreciated, the lateral sides of the platform 26, the pivot means 29 and the tower 7, including the various railing components, carried by these basic elements are disposed in substantially coplanar alignment on each tower side.

Mobility of the stand 1 is ensured by caster wheels 71, 72, 73 and 74. As shown in FIGURES 1 and 2, caster wheels 71 and 72 are pivotally mounted on the outermost ends of shields 12 and 13, respectively. Caster wheels 73 and 74 are pivotally mounted at the outermost ends of wings 21 and 22.

For stability purposes, wings 21 and 22 may carry vertically adjustable and ground-engaging clamps or jacks 75 and 76. These jacks may comprise vertically extending, threaded rods 77 which are threadably mounted in the base member 23 and which support ground-engaging pads 78.

Thus, after the tower has been moved on the caster wheels to a selected position, the rods 77 may be rotated so as to lower the pads into stabilizing engagement with the pad surface. With the pads 78 thus engaged, inadvertent movement of the stand 1 is effectively controlled.

*Planar relationships existing in relation to stand*

Figures 7, 8:
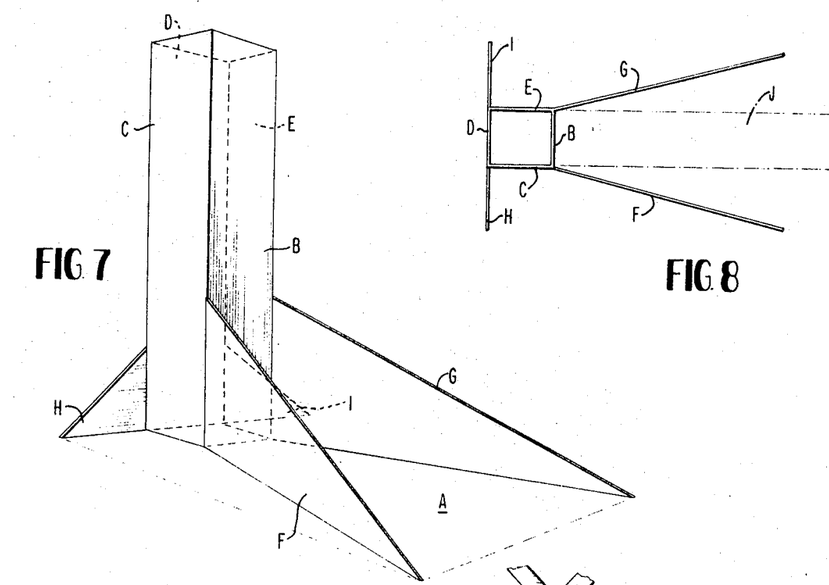
FIGURE 7 schematically illustrates the relationships existing between alignment planes of basic components of the FIGURE 1 stand.
FIGURE 8 provides a view of the relationships existing between the planes shown in FIGURE 7 when these planes are viewed in plan view.

FIGURES 7 and 8 illustrate basic relationships existing between the alignment planes of the stand 1.

The base 2 is aligned with a horizontally extending plane A.

The sides of tower 7 are defined by vertically extending planes B, C, D, and E which cooperate to define a rectangularly cross-sectioned column. Plane B is aligned with members 9 and 10; plane C is aligned with members 8 and 9; plane D is aligned with members 8 and 11, while plane E is aligned with members 11 and 10.

Shields 12 and 13, respectively, are aligned with wedge-shaped and vertically extending planes F and G which diverge outwardly from plane B. The stabilizing wings 21 and 22 are aligned with a pair of mutually coplanar and generally wedged-shaped planes H and I, as well as the rear tower plane D.

Planes H and I are perpendicular to plane A and coplanar with plane D. A vertical median plane passing between the outwardly diverging planes F and G is perpendicular to the aligned vertical planes H and I.

The vertical travel zone J of the platform 26, shown in phantom line in FIGURE 8, is disposed generally between the shield defining planes F and G.

The rectangular, columnar form of the tower 7, as defined by the planes B, C, D and E, minimizes the lateral space occupied by the stand 1 and enables the tower 7 to be moved into extremely close proximity to an aircraft.

The shield defining planes F and G effectively shield the travel zone J of the working platform while yielding a relatively uncluttered area.

The orientation of the stabilizing planes H and I provides stabilizing action in conjunction with the orientation of the shielding planes F and G. Significantly, the disposition of the planes F, G, H and I ensures stabilization, while maintaining the basic stand structure forward of the rear tower plane D. With this arrangement, the stairways may be installed in the tower 7 without cluttering the tower sides or the forward side of the tower.

*Structural details of operating mechanism for pivot means*

Structural details of the operating mechanism 33 are illustrated in FIGURES 9, 10, 11 and 12.

Figure 9:
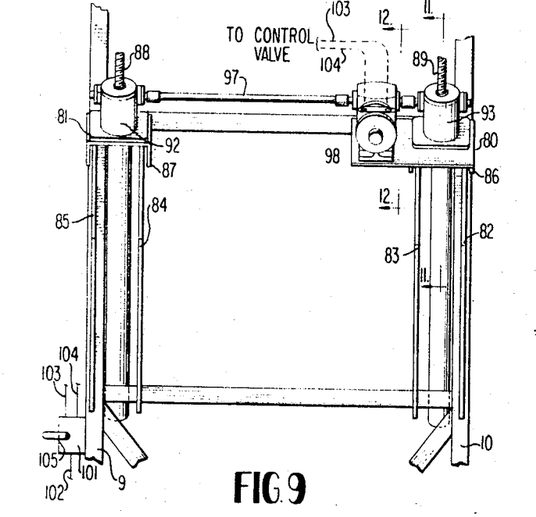
FIGURE 9 provides a front elevational view of a platform elevating mechanism incorporated in the FIGURE 1 stand.
Figure 10:
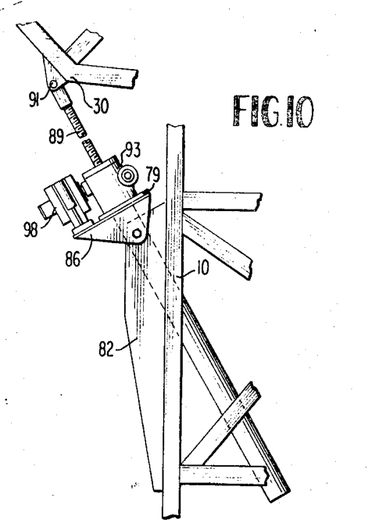
FIGURE 10 provides a side elevational view of the FIGURE 9 elevating mechanism.

Operating mechanism 33 includes a mounting plate 79 pivotally supported by pivot mounts 80 and 81 on tower brackets 82, 83, 84 and 85. Brackets 82 and 83 extend, as parallel plates, vertically along the forward edge of tower framing member 10. The upper ends of brackets 82 and 83 are received between a U-shaped bracket 86 depending from the underside of platform 79. Bracket 86 is journaled on bracket plates 82 and 83 for horizontal pivotal movement. Similarly, bracket members 84 and 85 project vertically along frame member 9. A U-shaped mounting bracket 87, depending downwardly from mounting plate 79, is journaled to the mounting brackets 84 and 85, with the brackets 84 and 85 being received between the downwardly depending legs of the bracket 87. The pivot axis of bracket 87 is aligned with that of bracket 86.

A pair of rod-like screw jacks 88 and 89 extend between the plate 79 and the truss 30.

Screw jack 88 is pivotally connected at pivot joint 90 to one side of the underside of truss 30, while screw jack 89 is pivotally connected to the other side of the underside of the truss 30 at pivot joint 91. Pivot joints 90 and 91 have a common, horizontal, pivot axis extending parallel to the pivot axis of brackets 86 and 87 and perpendicular to a median plane passing longitudinally through the tower 7 and pivot connection 29. Screw jack 88 is threadably received within a rotary drive nut assembly 92, while screw jack 89 is similarly received withn a rotary drive nut assembly 93. Drive nut assemblies 92 and 93 are spaced horizontally along the pivoted mounting plate 79.

Drive assemblies 92 and 93 are substantially identical such that structural details of one drive nut assembly alone need be described.

Figures 11, 12, 13:
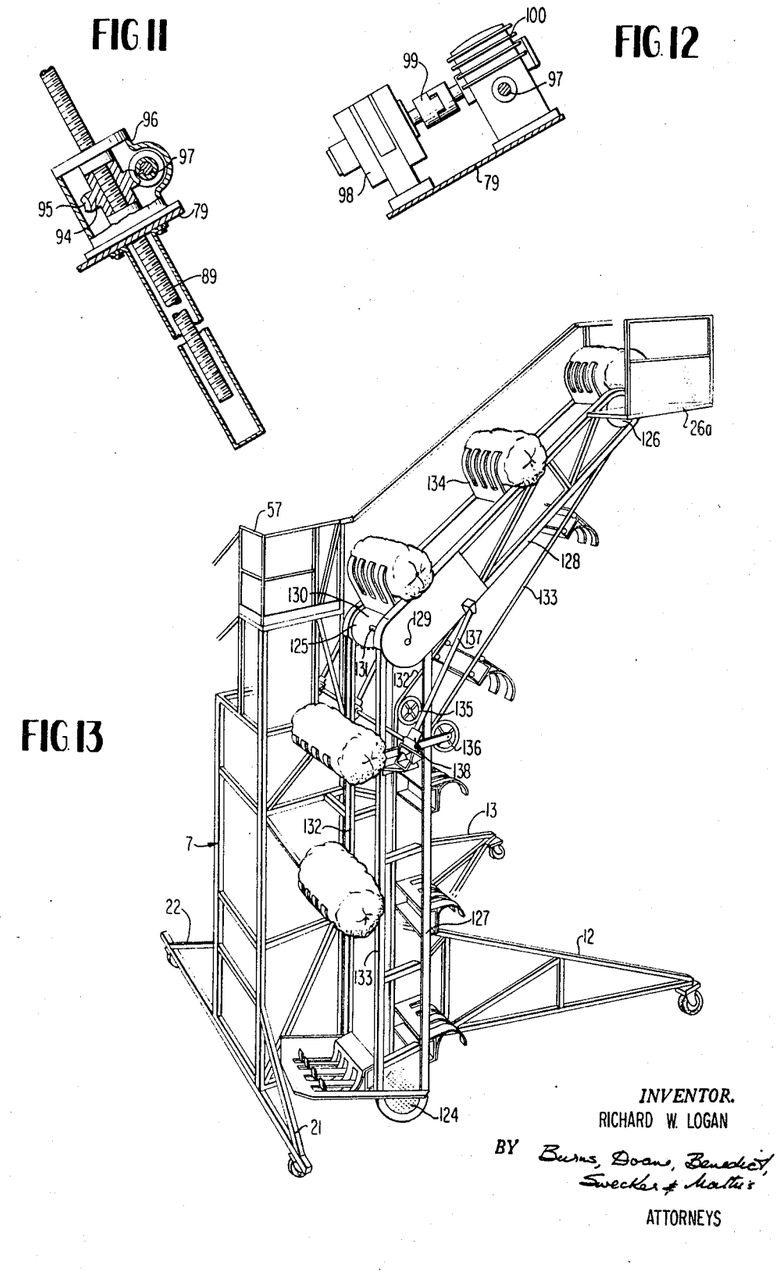
FIGURE 11 provides a transverse sectional view of a screw jack component of the FIGURE 9 elevating mechanism as viewed along the section line 11—11 of FIGURE 9.
FIGURE 12 provides a transverse sectional view of a drive coupling existing between a motor and drive shaft of the FIGURE 9 mechanism as viewed along the section line 12—12 of FIGURE 9.
FIGURE 13 provides a perspective view of the FIGURE 1 stand in reduced scale, modified by the addition of an endless drive conveyor system.

FIGURE 11 illustrates structural details of the drive nut assembly 93. This assembly includes a collar 94 which is threadably engaged with the outer periphery of the screw jack 89. A rimlike gear 95 is carried by the threaded collar 94. As shown in FIGURE 11, a threaded collar 94 is in essence retained or journaled within a housing 96 which surrounds the collar 94.

A drive shaft 97 passes through and is journaled within the housing 96. A meshing engagement exists between a worm gear defined by the drive shaft 97, and the rim gear 95. The other end of the drive shaft 97 provides a worm gear which is meshingly engaged with a rotary drive nut in the mechanism 92. This worm gear connection is identical to that described in connection with the mechanism 93.

A selectively reversible, pneumatically operated, rotary motor 98 is mounted on the platform 79, as shown in FIGURES 11 and 12. A drive shaft coupling 99 interconnects the motor 98 with a gear reduction unit 100. Gear reduction unit 100 provides a driving connection between the motor 98 and the drive shaft 97 in a conventional fashion.

Thus, by actuating the reversible motor 98 in a particular direction, the rotary drive nuts of the mechanisms 92 and 93 will be rotated in unison so as to impart the same direction of axial movement to the screw jacks 88 and 89. This parallel movement of the screw jacks 88 and 89 will in turn induce pivotal movement of the pivot connection 29 in the desired direction.

The direction of the elevational movement of the pivot connection 29, which will determine whether the platform 26 is raised or lowered, is controlled merely by selecting an appropriate direction of rotation for the motor 98.

Rotation of the motor 98 is controlled by a conventional valve mechanism 101. Pressurized fluid is supplied to valve mechanism 101 through conduit 102. Two flow lines 103 and 104 provide different flow paths leading from the valve 101 to the motor 98. In a conventional fashion, the direction of rotation of the motor 98 will be determined by which flow path, 103 or 104, receives fluid from the valve mechanism 101. If an hydraulic motor is used, one of these flow paths will act as a fluid return line leading to valve 101. In this case, valve 101 would be connected with a flow line leading to a sump.

Pressurized fluid may be supplied to the conduit 102 from any conventional source, not shown.

The control of the valve 101 may be effected from any of several locations within the stand 1 through a series of mutually interlocked control levers.

As schematically shown in FIGURE 1, a valve controlling lever 105 projects outwardly from the valve housing 101. Lever 105 is pivotally mounted within the valve, in a conventional fashion, so as to operate a movable valve member. An operating lever 106 is pivotally mounted on the lower end of the tower 7, with the pivot axis 108 of the lever 106 being located immediately beneath the pivot axis 109 of the operating lever 105. The valve 101 and the operating lever 106 may each be mounted on the frame member 9 to facilitate this alignment. A rod-like linkage 110 extends vertically upwardly from the lever 106 to the valve operating lever 105. Linkage 110 is pivotally connected to each of the levers 106 and 105 at pivot connections 111 and 112, respectively.

A crank 113 is pivotally mounted on the upper end of the tower 7 on the railing portion 57. The pivot axis of crank 113 is aligned with the pivot axis 114 of railings 59 and 60.

Another rod-like linkage 115 projects vertically upwardly from pivot connection 112 to the horizontally extending arm 116 of crank 113. Thus, linkage 115 is pivotally connected to lever 105 at pivot connection 112 and is pivotally connected to the crank arm 116 at pivot connection 117. It will also be recognized that the pivot axis 114 is disposed in substantially parallel and coplanar relationship with the pivot axes 109 and 108, as well as the axis of connections 112 and 117.

A third operating lever 118 is pivotally mounted on the railing 59 at pivot connection 119. The pivot axis of connection 119 is parallel to the pivot axis 114. A parallelogram linkage 120 interconnects the lever 118 with an upwardly projecting arm 116a of the crank 113. Linkage 120 is joined to lever 118 at pivot connection 121 and is pivotally joined to arm 120 at pivot connection 122. The pivot axes of connections 121 and 122 are parallel with the pivot axis 114.

With this parallelogram linkage arrangement interconnecting the operating levers 118 and 116a, 105 and 106, the valve 101 may be operated from any of several locations. An operator on the ground may manipulate the lever 106 so as to induce appropriate operation of the valve-mounted operating lever 105. This same sort of operation of valve lever 105 may be effected by manipulating the lever 116a from the upper landing 51. In addition, an operator standing on the work platform 26 may effect the operation of the valve 105 by actuating the lever arm 118.

Because of the parallelogram linkage interconnecting the various levers of the control system, an operator at any one location can maintain complete control over the flow of fluid to the drive motor 98. For example, an operator on the platform 26 can immediately manipulate the lever 118 to corect any inadvertent manipulation of either the lever 106 or the lever 116a by other personnel.

It will also be noted that the parallelogram linkage arrangement, coupled with the concurrence of the pivot axis 114 with the pivot axis of the crank 116, ensures that the valve lever 105 is not moved in response to pivotal movement of the truss 30. However, it will be appreciated that the operating lever 118 will maintain a fixed position in space as the truss 30 undergoes pivotal elevating movement.

*Conveyor Modification*

FIGURE 13 illustrates the stand 1 modified by the addition of an articulated article conveyor 123.

Article conveyor 123 is defined by a series of three, parallel, peripherally ribbed, drive wheel assemblies 124, 125 and 126. Drive wheel assembly 124 is rotatably mounted on the lower end of the tower 7 while drive wheel assembly 125 is mounted at the upper end of the tower. The pivot axes of the drive wheel assemblies 124 and 125 are mutually parallel and aligned with a vertical plane extending through the pivot axes of pivot joints 32 and 43. A schematically shown framing network 127 is attached to the tower 7 and provides support for the drive wheel assemblies 124 and 125.

Another framing assembly 128 is fixedly mounted on pivot joint means 129 and pivotally connected with tower 7 at pivot connection 32. The pivot axis of connection 32 is aligned with the axis of rotation of drive wheel assembly 125.

As will be apparent by reference to FIGURE 13, each drive wheel assembly includes a pair of peripherally ribbed wheels 130 which are spaced horizontally along a shaft 131. The "inboard" wheels of each assembly which are disposed in closest proximity to the tower 7 are disposed in coplanar alignment. Similarly, the wheels of the assembly which are disposed in the "outboard" relation with respect to the tower 7 are also located in mutually copanar alignment.

A ribbed drive belt 132 is mounted on the inboard drive wheels of the assemblies 124, 125 and 126. Another ribbed drive belt 133 is mounted on the outboard drive wheels of these assemblies. A series of cup-like article support means 134 are mounted on the drive belts 132 and 133 and extend between these belts.

In the area beneath the wheel assembly 125 the belts 132 and 133 are supported on idler wheels 132 and 136, respectively. These idler wheels may be integrated with conventional, drive belt tensioning devices to ensure that a proper belt tensioning is maintained. This tensioning is desirable because the pivotal movement of the frame 128, concurrent with that of the truss 30, will tend to produce some minor changes in belt slackness in the system.

As will be apparent, the article supporting elements 134 must be mounted between belts 132 and 133 so as to avoid interference with the idler wheels 135 and 136.

The lower drive wheel assembly 124 may be provided with a power source, not shown, so as to impart movement to the drive belts 132 and 133. In this manner the article support means 134 are elevated along the frame means 127 and then transmitted along the frame means 128 to the platform 26.

As shown, the platform 26 has been modified by the addition of a laterally projecting extension 26a which serves to provide an article discharge area laterally adjacent the main platform 26, previously discussed.

The framework 128 is rigidly attached to the truss 30 so as to undergo joint pivotal movement with this truss 30. Additional support for the framing 128 may be provided through a third screw jack 137 and a drive nut assembly 138 identical to those incorporated in the main, pivot operating mechanism 33.

With the conveyor arrangement shown in FIGURE 13, articles may be loaded at a ground surface on support means 34 and conveyed upwardly to a work platform 26a for handling at the elevated location of the platform 26.

It should be noted that the conveyor system remains operable throughout the pivotally effected elevating and lowering movement of the platform 26.

*Boom modification*

FIGURE 15 illustrates a modified form of the tower 1 which has been augmented by a boom mechanism 139. Boom mechanism 139 incudes a vertically extending mast 140. Mast 140 is journaled on frame member 9 and railing 57 by pivot mounting means 141 and 142, as shown in FIGURE 15. Thus, mast 140 is free to pivot about a vertical axis.

A boom 143 is pivotally connected by a pivot joint 144 to the mast 140. This pivot joint has a horizontal axis of rotation.

A hoisting mechanism 145 is mounted on the mast 140 and includes a cable 146 extending from a mast mounted sheave 147 to the end of the boom 143. By operating the hoisting mechanism 145, the elevation of the outer end of the boom 143 may be adjusted. As will be appreciated, such adjustments in elevation will also effect the distance of the outer end of the boom from the mast 140.

Another hoisting mechanism 148 mounted on the mast 140 provides a hoisting cable 149 extending to a sheave 150 at the outer end of the boom 143. The cable 149 extends to a load engaging device 151. Thus, by operating the hoisting mechanism 148 a load secured by the device 151 may be moved up or down in relation to the boom tip.

By appropriate manipulations of the hoisting mechanisms 145 and 148, loads may be picked up from a variety of locations adjacent the stand 1 and moved to the working platform 26. Additionally, loads on the platform 26 may be picked up by the load handling device and either moved to an aircraft or held in space adjacent an aircraft while work operations are being performed.

Because of the additional loading stress imposed by the operation of the mechanism 139, an outrigger 152 may be mounted on the tower 7 adjacent the tower leg 9. The outrigger may be mounted on a pivot mount 153 for lateral swinging movement. The outer extremity of the outrigger 152 may be provided with an adjustable ground-engaging pad 154. Pad 154 may be carried by a threaded rod 155 which is threadably and adjustably received within a mounting collar 156.

*Summary of major advantages and scope of invention*

A principal advantage of the service stand resides in its basic stability, unencumbered work space, and minimized areal extent.

The low center of gravity provided by the planar base in combination with the columnar tower provides a stable structure of minimum lateral dimensions which can be brought into especially close proximity to an aircraft from a variety of directions.

The shielding members effectively protect the elevating area of the work platform without creating obstructions.

The operating mechanism utilizes the operating components, i.e. the screw jacks to protect or laterally shield the operating motor.

The interlocked, multiple control station structure enables an operator to selectively adjust the position of the working platform from a variety of locations. Possible confusion which could result from contradictory operation of diverse control units is positively avoided through the utilization of the parallelogram linkage arrangement which interconnects the operating levers.

By maintaining the pivot mechanism 29 and the tower 7 with coplanar sides, lateral stand dimensions are minimized and effective supporting surfaces are provided for such auxiliary components as conveyor mechanisms.

A particularly significant advantage of the invention resides in the extreme range of vertical positions of the working platform 26, coupled with the exceedingly low base structure. This enables the stand to be moved into sufficiently close proximity to an aircraft so that the extraordinary elevating range of the platform may be effectively employed.

In describing the invention, reference has been made to preferred embodiments. However, those skilled in the service stand art and familiar with the disclosure of the invention may well recognize additions, deletions, substitutions or other modifications which would fall within the purview of the invention as set forth in the appended claims.

I claim:

1. A stand for servicing aircraft comprising:
 base means comprising a plurality of framing members oriented in substantially horizontal and coplanar relationship;
 tower means comprising a plurality of horizontally spaced, vertically extending, and mutually parallel, framing members interconnected with said base means and projecting upwardly therefrom, said tower means having a generally rectangular, horizontal cross section;
 first and second, generally wedge-shaped shield means, each of said first and second shield means comprising a plurality of framing members disposed in substantial coplanar alignment with a vertical plane, with the vertical alignment planes of said first and second shield means diverging horizontally outwardly from said tower means and cooperating with said tower means to define an unobstructed and laterally shielded zone adjacent said tower means and said base means;
 platform means;
 pivot mounting means spaced vertically above said shield means and pivotally connecting said platform means with said tower means for vertical, pivotal movement between said diverging vertical planes of said first and second shield means;
 first and second stabilizing wing means disposed in connected and substantially coplanar relationship with one side of said tower means, said first and second wing means extending generally perpendicular to a median vertical plane passing between said first and second wing means;
 said platform means, said pivot mounting means and said tower means having substantially coplanar, lateral peripheries extending generally parallel with said median plane;
 articulated stair means carried by said pivot mounting means and including a plurality of treads;
 parallelogram linkage means connected with said treads, said platform means, and said tower means, and operable to maintain each of said treads and said platform means in a substantially horizontal alignment through the vertical pivotal movement of said platform means;
 operating means for actuating said pivot mounting means; and
 wheel means connected with said base means and supporting said base means above a ground surface for rolling movement therealong.

2. A stand for servicing aircraft, said stand comprising:
 base means comprising a plurality of framing members oriented in substantially horizontal and coplanar relationship;
 tower means comprising at least four horizontally spaced, vertically extending, and mutually parallel, framing members interconnected with said base means and projecting upwardly therefrom, said tower means having a generally rectangular, horizontal cross section;
 first and second, generally wedge-shaped shield means, each of said first and second shield means comprising a plurality of framing members disposed in substantial coplanar alignment with a vertical plane, with the vertical alignment planes of said first and second shield means diverging horizontally outwardly from said tower means and cooperating with said tower means to define an unobstructed and laterally shielded zone adjacent said tower means and said base means;

platform means;

pivot mounting means spaced vertically above said shield means and pivotally connecting said platform means with said tower means for vertical, pivotal movement between said diverging vertical planes of said first and second shield means;

first and second stabilizing wing means disposed in connected and substantially coplanar relationship with one side of said tower means, said first and second wing means extending generally perpendicular to a median vertical plane passing between said first and second wing means;

said platform means, said pivot mounting means and said tower means having substantially coplanar, lateral peripheries extending generally parallel with said median plane;

articulated stair means carried by said pivot mounting means and including a plurality of treads;

parallelogram linkage means connected with said treads, said platform means, and said tower means, and operable to maintain each of said treads and said platform means in a substantially horizontal alignment throughout the vertical pivotal movement of said platform means;

operating means for actuating said pivot mounting means;

first control means for said operating means mounted on a lower portion of said tower means adjacent said base means;

second control means for said operating means mounted on an upper portion of said tower means adjacent said articulated stair means;

third control means for said operating means mounted on said platform means;

linkage means interconnecting said first, second and third control means and operable to simultaneously actuate each of said control means in response to actuation of one of said control means; and wheel means connected with said base means and supporting said base means above a ground surface for rolling movement therealong.

3. A stand as described in claim 2 wherein said operating means comprises:

a mounting platform pivotally mounted on said tower means above said shield means, said platform being mounted for pivotal movement about a horizontal axis extending perpendicular to said median plane;

first and second screw jack means, each of said screw jack means being pivotally connected at one end to said pivot mounting means and extending through a substantially vertical plane to said mounting platform means;

said first and second screw jack means being horizontally spaced along said mounting platform means;

first and second rotary nut means journaled on said mounting platform means and threadably engaged with said first and second screw jack means, respectively;

horizontally extending drive shaft means journaled on said mounting platform means, said drive shaft means extending between and drivingly connecting each of said rotary nut means; and motor and drive means mounted on said mounting platform means and disposed generally horizontally between said first and second rotary nut means, said motor and drive means being disposed in driving engagement with said drive shaft means and mounted for pivotal movement with said mounting platform means.

4. A stand as described in claim 3 and including conveyor means comprising:

first rotary means having a horizontal axis of rotation and mounted at a lower end of said tower means;

second rotary means having a horizontal axis of rotation and mounted on an upper portion of said tower means vertically above said first rotary means;

third rotary means connected with said platform means and having a horizontal axis of rotation;

said axes of rotation of said first, second and third rotary means being mutually parallel;

endless drive means mounted on said first, second and third rotary means and operable to continuously traverse a path extending from said first rotary means to said second rotary means, then to said third rotary means, back to said second rotary means, and finally back to said first rotary means;

spaced, article conveyor means carried by said endless drive means; and drive means for imparting movement to said endless drive means so as to cause said endless drive means to traverse said path;

said axis of rotation of said second rotary means coinciding with the pivot axis of said pivot mounting means in relation to said tower means.

5. A stand as described in claim 3 further including boom means comprising:

vertically extending mast means mounted on said tower means and extending along peripheral portions of said stair means and said tower means and intersecting the pivot axis of the pivot connection between said tower means and said pivot mounting means;

a boom mounted on said mast means for pivotal movement about a horizontal axis and projecting outwardly from said mast means to a location disposed generally above said platform means;

hoisting means mounted on said mast means and including flexible means extending to an end portion of said boom means, said hoisting means being operable to effect raising and lowering of said end portion of said boom means; and mounting means supporting said boom means for pivotal movement about a vertical axis.

References Cited

UNITED STATES PATENTS

| | | | |
|---|---|---|---|
| D. 199,148 | 9/1964 | Matthews | 182—2 |
| 2,362,170 | 11/1944 | Swaisgood | 182—1 |
| 2,963,178 | 12/1960 | Walker | 182—43 |
| 3,018,842 | 1/1962 | Abrell | 182—43 |

FOREIGN PATENTS

| | | |
|---|---|---|
| 818,493 | 8/1959 | Great Britain. |
| 974,654 | 11/1964 | Great Britain. |

REINALDO P. MACHADO, *Primary Examiner.*

U.S. Cl. X.R.

182—2, 129; 198—156